(12) United States Patent
Shen et al.

(10) Patent No.: US 10,602,043 B2
(45) Date of Patent: Mar. 24, 2020

(54) CAMERA MODULE

(71) Applicants: O-FILM IMAGE TECHNOLOGY (GUANGZHOU) CO., LTD., Guangzhou (CN); NANCHANG O-FILM OPTICAL-ELECTRONIC TECH CO., LTD., Nanchang (CN)

(72) Inventors: Chengzhe Shen, Nanchang (CN); Jun Feng, Nanchang (CN); Shumin Zhu, Nanchang (CN); Shengyun Zhang, Nanchang (CN); Wenhua Shuai, Nanchang (CN); Dong Tang, Nanchang (CN)

(73) Assignees: O-FILM IMAGE TECHNOLOGY (GUANGZHOU) CO., LTD., Guangzhou (CN); NANCHANG O-FILM OPTICAL-ELECTRONIC TECH CO., LTD., Nanchang (CN)

( * ) Notice: Subject to any disclaimer, the term of this patent is extended or adjusted under 35 U.S.C. 154(b) by 5 days.

(21) Appl. No.: 16/132,198

(22) Filed: Sep. 14, 2018

(65) Prior Publication Data
US 2019/0089881 A1 Mar. 21, 2019

(30) Foreign Application Priority Data
Sep. 15, 2017 (CN) .................... 2017 2 1208374 U

(51) Int. Cl.
*H04N 5/225* (2006.01)
(52) U.S. Cl.
CPC ......... *H04N 5/2257* (2013.01); *H04N 5/2253* (2013.01); *H04N 5/2254* (2013.01)

(58) Field of Classification Search
CPC .................................................. H04N 5/2257
USPC ........................................................ 348/374
See application file for complete search history.

(56) References Cited

U.S. PATENT DOCUMENTS

| 10,477,088 | B2 * | 11/2019 | Wang ....................... G02B 7/02 |
| 2018/0007244 | A1 | 1/2018 | Wang et al. |
| 2019/0086771 | A1 | 3/2019 | Shen et al. |
| 2019/0088698 | A1 | 3/2019 | Shen et al. |
| 2019/0088699 | A1 | 3/2019 | Shen et al. |
| 2019/0089882 | A1 | 3/2019 | Shen et al. |
| 2019/0089883 | A1 | 3/2019 | Shen et al. |

(Continued)

OTHER PUBLICATIONS

U.S. Office Action dated Oct. 7, 2019, issued on U.S. Appl. No. 16/132,295 in the name of Nanchang O-Film Optical-Electronic Tech Co., Ltd.

(Continued)

*Primary Examiner* — Joel W Fosselman
(74) *Attorney, Agent, or Firm* — Franklin & Associates International Inc.; Matthew F. Lambrinos

(57) ABSTRACT

A camera module includes: a circuit board; a photosensitive chip located on and coupled to the circuit board; a package body packaged on the circuit board; and a bracket located on a side of the package body away from the circuit board; wherein the bracket is provided with a step away from the package body, a sidewall of the step is inclined with respect to an optical axis of the camera module, a distance between the sidewall of the step and the optical axis gradually increase along a direction from the circuit to the package body, and an angle between the sidewall of the step and the optical axis ranges from 0.5° to 30°.

17 Claims, 6 Drawing Sheets

(56) References Cited

U.S. PATENT DOCUMENTS

2019/0089884 A1 3/2019 Shen et al.
2019/0089885 A1 3/2019 Shen et al.
2019/0148429 A1 5/2019 Wang et al.
2019/0165019 A1 5/2019 Wang et al.

OTHER PUBLICATIONS

Non-Final Office Action dated Aug. 7, 2019 issued on U.S. Appl. No. 16/132,260 to Nanchang O-Film Optical-Electronic Tech Co., Ltd.

* cited by examiner

CAMERA MODULE

CROSS-REFERENCE TO RELATED APPLICATIONS

This application claims priority to Chinese Patent Application No. 2017212083748, entitled "CAMERA MODULE" filed Sep. 15, 2017, the contents of which is expressly incorporated herein by reference in its entirety.

TECHNICAL FIELD

The present disclosure relates to camera technologies, and more particularly relates to a camera module.

BACKGROUND

As shown in FIG. 1, a conventional camera module 10 includes a circuit board 11, a photosensitive chip 12 located on the circuit board 11, a package body 13 packaged on the circuit board 11 and extending onto the photosensitive chip 12, electronic components 14 and conductive lines 15 packaged in the package body 13, a filter 16, and a lens assembly including a barrel 17 and a lens (not shown) provided in the barrel 17. A step portion for disposing the filter is defined on a surface of the package body 13 away from the circuit board 11. The surface of the package body 13 away from the circuit board 11 is further used to support the barrel 17. As a carrier for the filter 16 and the lens assembly, the package body 13 is required to have a certain strength, which requires the package body 13 to have a certain size in each of three directions along X, Y, and Z axes. However, as an optical axis 10a of the camera module 10 is parallel to the Z axis, the larger the length of the package body 13 in the Z axis direction, the more difficult for controlling a center axis of a light transmission hole of the package body 13 to be coincided with the optical axis 10a, which makes it even more difficult to obtain a camera module with higher imaging quality.

SUMMARY

According to various embodiments of the present disclosure, a camera module is provided.

A camera module includes a circuit board; a photosensitive chip located on and coupled to the circuit board; a package body packaged on the circuit board; and a bracket located on a side of the package body away from the circuit board; wherein the bracket is provided with a step away from the package body, a sidewall of the step is inclined with respect to an optical axis of the camera module, a distance between the sidewall of the step and the optical axis gradually increase along a direction from the circuit to the package body, and an angle between the sidewall of the step and the optical axis ranges from 0.5° to 30°.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

Reference will now be made to the drawings to describe, in detail, embodiments of the present camera module. It should be noted that references to "an" or "one" embodiment in this disclosure are not necessarily to the same embodiment, and such references mean at least one.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Figure 1:
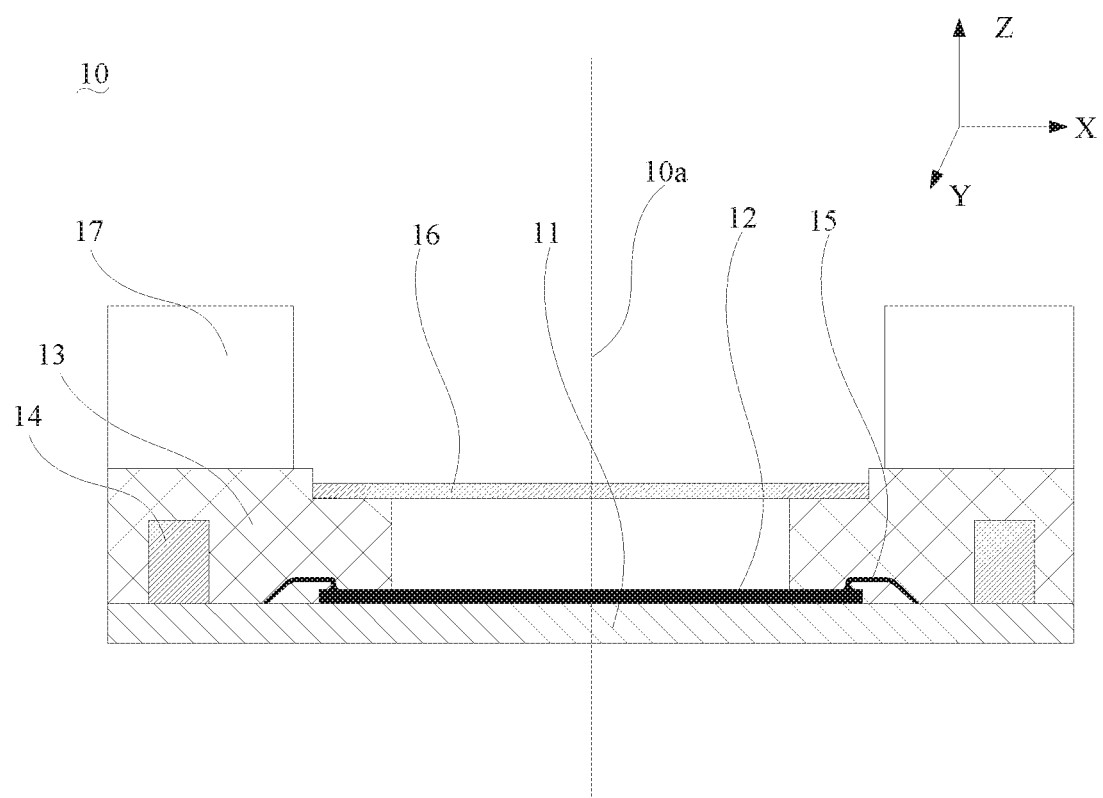
FIG. 1 is a cross-sectional view of a camera module in the prior art.
Figure 2:
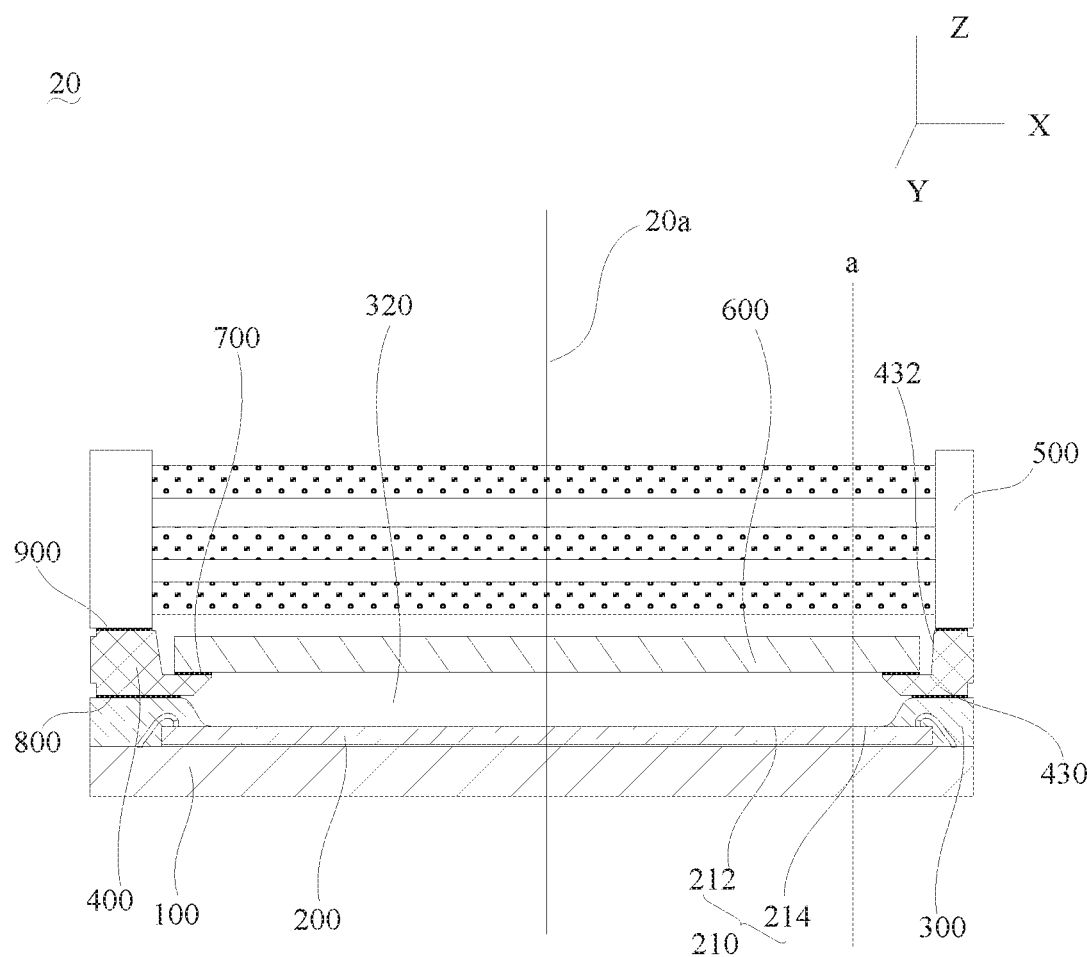
FIG. 2 is a cross-sectional view of a camera module in accordance with an embodiment.

Referring to FIG. 2, a camera module 20 in accordance with an embodiment can be of a rectangular shape, a cylindrical shape, or the like. In a space coordinate system, the camera module 20 has a certain length in the X-axis direction, a certain width in the Y-axis direction, and a certain distance in the Z-axis direction. The camera module 20 has an optical axis 20a, which is parallel to the Z axis. The camera module 20 includes a circuit board 100, a photosensitive chip 200, a package body 300, a bracket 400, a lens assembly 500, and a filter 600.

The photosensitive chip 200 is located on and electrically coupled to the circuit board 100. The photosensitive chip 200 includes a photosensitive surface 210 away from the circuit board 100. The photosensitive surface 210 includes a photosensitive region 212 and a non-photosensitive region 214 surrounding the photosensitive region 212. A boundary between the photosensitive region 212 and the non-photosensitive region 214 is indicated by a broken line α.

Figure 3:
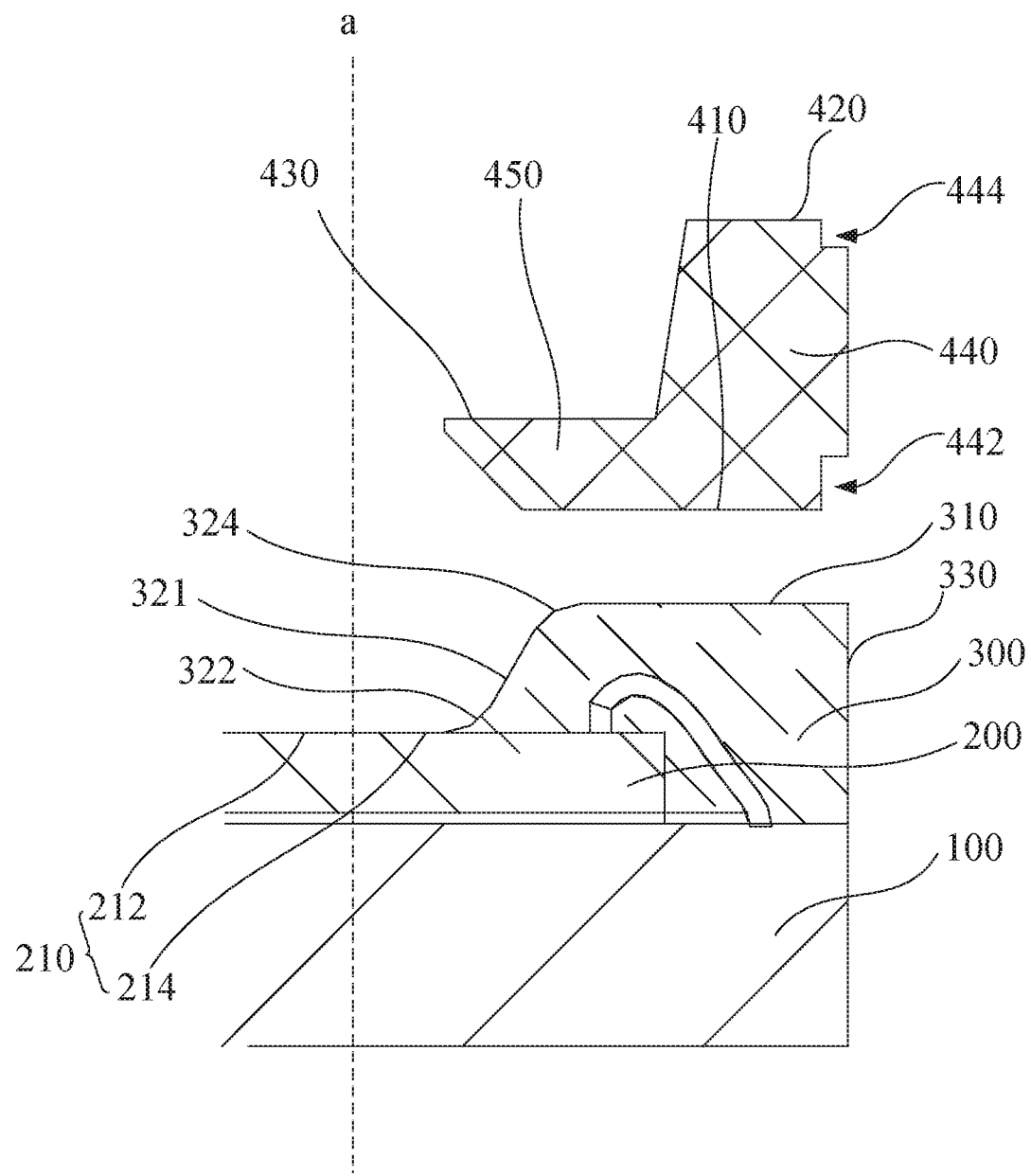
FIG. 3 is a enlarged view illustrating a package body and a bracket of FIG. 2.

Referring to FIGS. 2 and 3, the package body 300 is packaged on the circuit board 100. In the illustrated embodiment, the package body 300 encapsulates a portion of the non-photosensitive region 214, which enhances a connection between the photosensitive chip 200 and the circuit board 100. The remain portion of the non-photosensitive region 214 is exposed to the outside. During the formation of the package body 300, if the material for forming the package body 300 leaks, the exposed portion of the non-photosensitive region 214 can receive the leaked material, thus preventing material for forming the package body 300 from flowing to the photosensitive region 212. In addition, when the package body 300 extends towards an inside of the non-photosensitive region 214, the size of the package body 300 in the XY plane can be reduced without changing the bearing strength of the package body 300.

The package body 300 includes a bearing surface 310 away from the circuit board 100. The bearing surface 310 is used to hold the bracket 400. The package body 300 defines a light transmission hole 320 in a middle portion thereof corresponding to the photosensitive surface 210. The light transmission hole 320 includes a sidewall 321. In the illustrated embodiment, the sidewall 321 is inclined with respect to the optical axis 20a, and a distance between the sidewall 321 and the optical axis 20a gradually increases along a direction from the circuit board 100 to the package body 300, which, on the one hand, can increase the luminous flux incident to the photosensitive surface 210, and on the other hand facilitate a demolding of an injection mold for forming the package body 300 and avoid damage to the package body 300. In the illustrated embodiment, a bottom of the light transmission hole 310 is provided with a concave surface 322 that is recessed toward the outer sidewall 330, which can facilitate the demolding of the injection mold for forming the package body 300 and avoid damage to the package body 300.

In the embodiment, a first round chamfer 324 is provided at a junction of the sidewall 321 and the bearing surface 310, which can facilitate the demolding of the injection mold for forming the package body 300 on the one hand, and reduce a flow speed of adhesive and deposit excessive adhesive on the other hand when attaching the bracket 400 and the package body 300, since the round chamfer has a greater resistance for the flow of the adhesive respective to an inclined surface. In addition, the round chamfer has a larger surface area compared to the inclined surface and can receive more adhesive, thus the adhesive can be effectively prevented from flowing to the photosensitive region 212.

Figure 4:
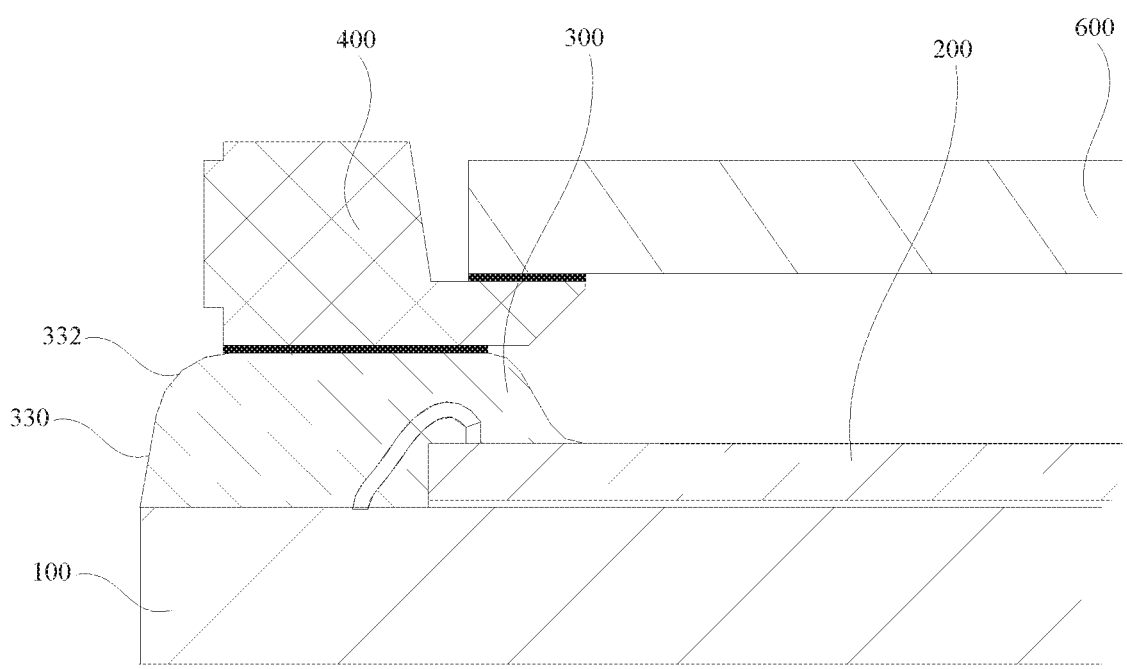
FIG. 4 is a enlarged view illustrating a left side of a camera module in accordance with another embodiment.

The package body 300 further includes an outer sidewall 330. In the illustrated embodiment of FIG. 4, the outer sidewall 330 is inclined with respect to the optical axis 20a, and a distance between the outer sidewall 330 and the optical axis 20a gradually decreases along the direction from the circuit board 100 to the package body 300. In the illustrated embodiment, a second round chamfer 332 is provided at a junction of the outer sidewall 330 and the bearing surface 310, which can facilitate the demolding of the injection mold for forming the package body 300 and avoid damage to the package body 300.

Figure 5:
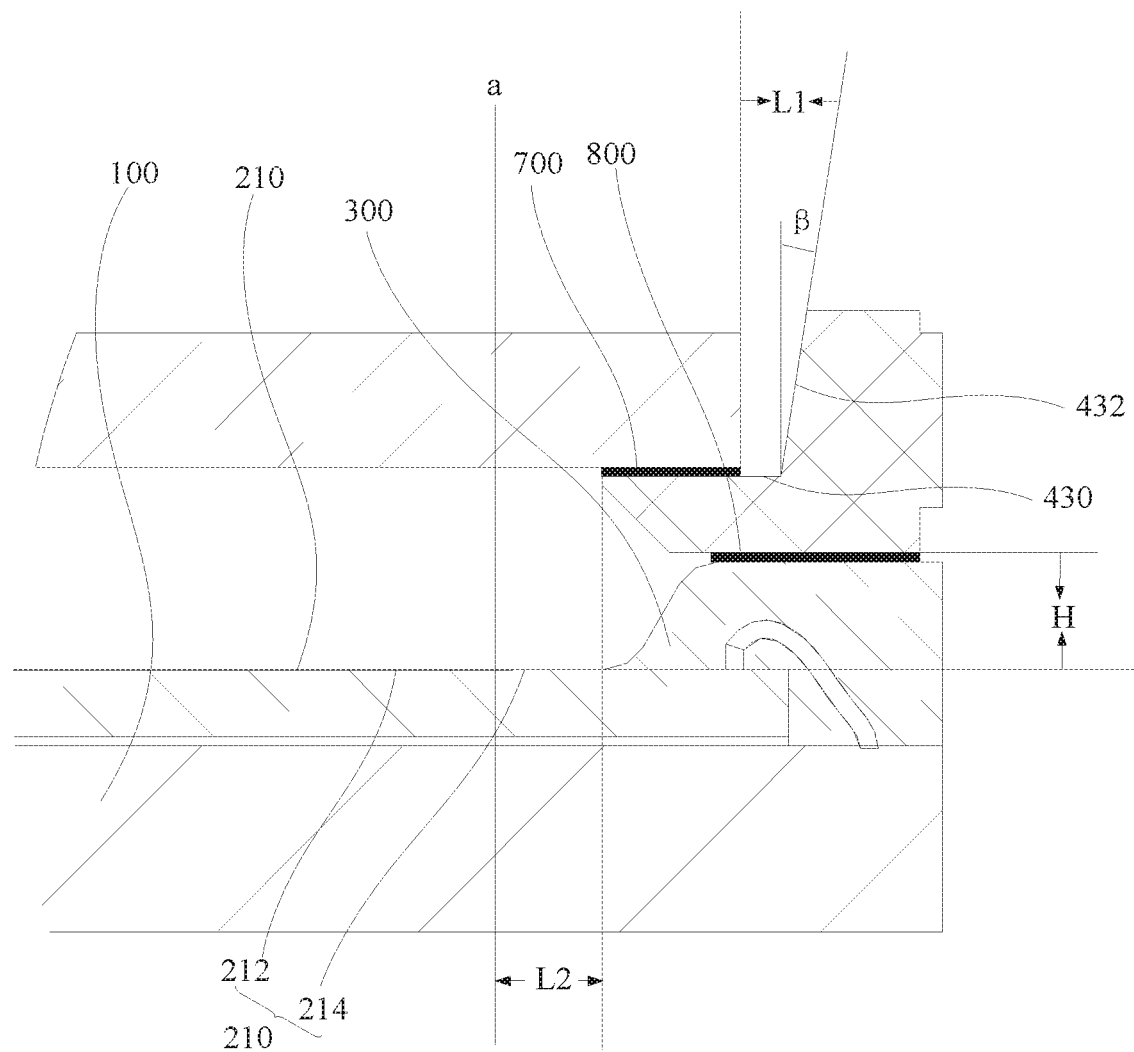
FIG. 5 is a enlarged view illustrating a right side of the camera module of FIG. 2.

Referring to FIGS. 2, 3, and 5, the bracket 400 is located on the bearing surface 310. The bracket 400 includes a first surface 410 contacting the bearing surface 310 and a second surface 420 opposite to the first surface 410. In the illustrated embodiment, an orthographic projection of the first surface 410 on the bearing surface 310 is located within the bearing surface 310. A vertical distance H between the first surface 410 and the photosensitive surface 210 ranges from about 150 μm to about 1500 μm, which can prevent light from being blocked by the bracket 400, thereby improving an imaging quality of the camera module 20. In one embodiment, the vertical distance H ranges from about 200 μm to 500 μm. Specifically, in the illustrated embodiment, the vertical distance H is 260 μm.

The bracket 400 includes a bracket body 440 and an extension structure 450. In the illustrated embodiment, a side of the bracket body 440 adjacent to the package body 300 is coplanar with a side of the extension structure 450 adjacent to the package body 300, that is, the side of the bracket body 440 adjacent to the package body 300 and the side of the extension structure 450 adjacent to the package body 300 cooperatively define the first surface 410, thereby increasing a connection area of the bracket 400 and the package body 300.

In the embodiment, the bracket body 440 defines a first recess 442 on an outer sidewall thereof adjacent to the package body 300, which can be used to receive excess adhesive when attaching the bracket 400 and the package body 300, thereby preventing the adhesive from flowing along the outer sidewall 330.

In the illustrated embodiment, the bracket body 440 defines a second recess 444 on the outer sidewall thereof away from the package body 300, which can be used to receive excess adhesive when attaching the lens assembly 500 and the bracket 400, thereby preventing the adhesive from flowing along the outer sidewall of the bracket 400.

The extension structure 450 is located on a lower portion of an inner wall 432 of the bracket body 440. In the illustrated embodiment, an orthographic projection of the extension structure 450 on the photosensitive surface 210 is located within the non-photosensitive region 214 and spaced apart from the photosensitive region 214, thereby preventing the extension structure 450 from blocking light emitted to the photosensitive region 212.

A distance L2 between an edge of the orthographic projection of the extension structure 450 on the photosensitive surface 210 and the photosensitive region 212 ranges from about 100 μm to 500 μm, which can prevent the extension structure 450 from blocking the light emitted to the photosensitive region 212, and it can ensure that the extension structure 450 and the bearing surface 310 have a large enough connection area. In one embodiment, the distance L2 ranges from about 200 μm to about 400 μm. Specifically, in the illustrated embodiment, the distance L2 is 300 μm.

Figure 6:
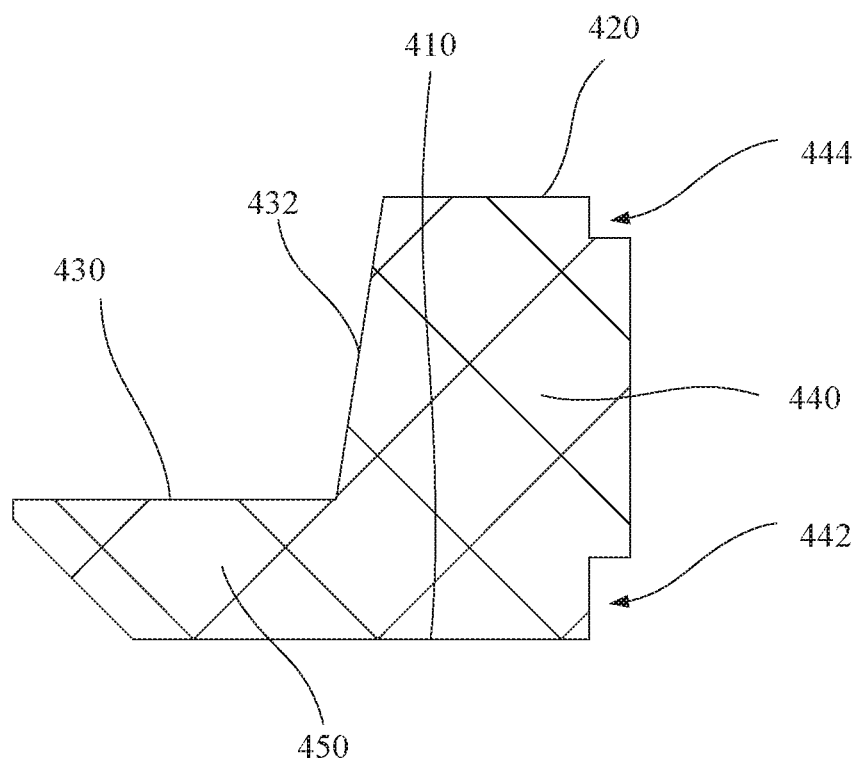
FIG. 6 is a enlarged view illustrating a right side of the bracket of FIG. 2.

Referring to FIGS. 2, 5, and 6, the extension structure 450 has a support surface 430 used to support the filter 600. The inner sidewall 432 of the bracket body 440 is inclined with respect to the optical axis 20a. A distance between the inner sidewall 432 and the optical axis 20a gradually increase along a direction from the circuit board 100 to the bracket 400. The inclined inner sidewall 432 can reduce the flow speed of the adhesive and deposit excessive adhesive when attaching the lens assembly 500 and the bracket 400 due to that the inclined sidewall 432 has a greater resistance for the flow of the adhesive than a vertical surface, and can receive more adhesive due to a greater area of the inclined sidewall 432 than that of a vertical surface. In the illustrated embodiment, an angle β between the sidewall 432 and the optical axis 20a ranges from about 0.5° to about 30°. In one embodiment, the angle β ranges from about 1° to about 10°, thereby ensuring the strength of the bracket 400 for stably supporting the lens assembly 500.

The lens assembly 500 is located on a top side of the bracket 400 away from the package body 300. In the illustrated embodiment, the lens assembly 500 is located on the bracket body 440.

In the illustrated embodiment, each end of the filter 600 is located on the support surface 430 and is spaced apart from the bracket body 440, thus a gap L1 is defined between the filter and the bracket body 440. The existence of the gap L1 can prevent the bracket body 440 from extruding and breaking the filter 600 when mounting the filter 600. In addition, the gap L1 can receive excessive adhesive when attaching the filter 600 and the bracket 400 and attaching the lens assembly 500 and the bracket 400.

It should be understood that, in the illustrated embodiment, the camera module 20 further includes a first adhesive layer 700 located between the extension structure 450 and the filter 600, a second adhesive layer 800 located between the bearing surface 320 and the first surface 410, and the third adhesive layer 900 located between the lens assembly 500 and the bracket body 440.

Compared with a conventional two-stage structure composed of a package body and a lens assembly, the aforementioned camera module 20 has a three-stage structure composed of the package body 300, the bracket 400, and the lens assembly 500, where partial package body in the conventional two-stage structure is replaced by the bracket, such that the formed package body 300 can have a relatively smaller length in the Z-axis direction. The smaller the length of the package body 300 in the Z-axis direction, the easier for controlling an alignment of the optical axis 20a of the camera module, thus a camera module 20 with a higher imaging quality is obtained.

During assembling of the camera module 20, the package body 300 with a relatively small length in the Z axis direction is formed in advance by using a fabrication process, and the center line of the light transmission hole 310 of the package body 300 is aligned with the optical axis 20a while forming the package body 300. Then, the bracket 400 provided with the filter 600 is located on the package body 300. Specifically, the center line of the bracket 400 is aligned with the optical axis 20a via coating adhesive on a side surface of the bracket body 410 adjacent to the package body 300 or the bearing surface 320 and adjusting the thickness of the adhesive thereof. Finally, the center line of the lens assembly 500 is aligned with the optical axis 20a via coating adhesive on a side surface of the bracket body 410 away from the package body 300 or the connecting side surface of the lens assembly 500 and adjusting the thickness of the adhesive thereof. The alignments between the center line of the bracket 400 and the optical axis 20a and between the center line of the lens assembly 500 and the optical axis 20a are staged controlled, which can reduce the control difficulty of each stage, thereby reducing the processing difficulty for manufacturing the camera module 20.

It should understood that, in alternative embodiments, the photosensitive chip 200 is completely exposed from the light transmission hole 320 and spaced apart from an inner wall of the light transmission hole 320, in that case, the package body 300 does not encapsulate the non-photosensitive region 214 of the photosensitive chip 200.

It should understood that, in alternative embodiments, the shape and size of the first surface 410 match the shape and size of the bearing surface 310, and the orthographic projection of the first surface 410 on the bearing surface 310 can coincide with the bearing surface 310 to ensure that the bracket 400 and the package body 300 can be completely attached, thereby firmly connecting the bracket 400 with the package body 300.

It should understood that, in alternative embodiments, the first recess 442 and the second recess 444 can be omitted.

It should understood that, in alternative embodiments, the photosensitive surface 210 can merely include the photosensitive region 212.

The technical features of the above embodiments can be arbitrarily combined. For the sake of brevity of description, all possible combinations of the technical features in the above embodiments are not described. However, as long as there is no collision in the combination of these technical features, it should be considered as the scope described in this specification.

The foregoing implementations are merely specific embodiments of the present disclosure, and are not intended to limit the protection scope of the present disclosure. It should be noted that any variation or replacement readily figured out by persons skilled in the art within the technical scope disclosed in the present disclosure shall all fall into the protection scope of the present disclosure. Therefore, the protection scope of the present disclosure shall be subject to the protection scope of the claims.

What is claimed is:

1. A camera module, comprising:
   a circuit board;
   a photosensitive chip located on and coupled to the circuit board;
   a package body packaged on the circuit board; and
   a bracket located on a side of the package body away from the circuit board; wherein the bracket comprises a bracket body and an extension structure located on an inner wall of the bracket body, an inner wall of the bracket body is inclined with respect to an optical axis of the camera module, a distance between the inner wall of the bracket body and the optical axis gradually increase along a direction from the circuit to the package body, and an angle between the inner wall of the bracket body and the optical axis ranges from 0.5° to 30°.

2. The camera module according to claim 1, wherein the angle between the inner wall of the bracket body and the optical axis ranges from 1° to 10°.

3. The camera module according to claim 1, wherein the photosensitive chip comprises a photosensitive surface, the photosensitive surface comprises a photosensitive region and a non-photosensitive region surrounding the photosensitive region, and the package body encapsulates a portion of the non-photosensitive region.

4. The camera module according to claim 1, wherein the package body defines a light transmission hole in a middle portion thereof, a sidewall of the light transmission hole is inclined with respect to the optical axis, and a distance between the sidewall of the light transmission hole and the optical axis gradually increases along the direction from circuit board to the package body.

5. The camera module according to claim 1, wherein the package body defines a light transmission hole in a middle portion thereof, and a bottom of the light transmission hole is provided with a concave surface recessed toward an outer sidewall of the package body.

6. The camera module according to claim 1, wherein the package body defines a light transmission hole in a middle portion thereof, the package comprises a bearing surface away from the circuit, and a first round chamfer is provided at a junction of the bearing surface and a sidewall of the light transmission hole.

7. The camera module according to claim 1, wherein the package body defines a light transmission hole in a middle portion thereof, the package body comprises an outer sidewall inclined with the optical axis, and a distance between the outer sidewall and the optical axis decreases along the direction from the circuit board to the package body.

8. The camera module according to claim 7, wherein the package comprises a bearing surface away from the circuit, and a second round chamfer is provided at a junction of the outer sidewall and the bearing surface.

9. The camera module according to claim 1 further comprising a filter located on the extension structure and spaced apart from the inner wall of the bracket body.

10. The camera module according to claim 1, further comprising a lens assembly located on the bracket away from the package body.

11. The camera module according to claim 1, wherein the photosensitive chip comprises a photosensitive surface, the photosensitive surface comprises a photosensitive region, the bracket comprises a bracket body and an extension structure extending from an inner wall of the bracket body, and a distance between an orthographic projection of the extension structure on the photosensitive surface and the photosensitive region ranges from about 100 μm to about 500 μm.

12. The camera module according to claim 11, wherein the distance between the orthographic projection of the extension structure on the photosensitive surface and the photosensitive region ranges from about 200 μm to about 400 μm.

13. The camera module according to claim 1, wherein the photosensitive chip comprises a photosensitive surface, the bracket comprises a first surface adjacent to the package body, and a distance between the first surface and the photosensitive surface ranges from about 150 μm to about 1500 μm.

14. The camera module according to claim 13, wherein the distance between the first surface and the photosensitive surface ranges from about 200 μm to about 300 μm.

15. The camera module according to claim 13, wherein the package body comprises a bearing surface away from the circuit board, and an orthographic projection of the first surface on the bearing surface is located within the bearing surface.

16. The camera module according to claim 1, wherein the bracket body defines a first recess on an outer sidewall of the bracket body adjacent to the package body for receiving excess adhesive when attaching the bracket and the package body.

17. The camera module according to claim 1, wherein the bracket body defines a second recess on an outer sidewall of the bracket body away from the package body for receiving excess adhesive when attaching the lens assembly and the bracket.

* * * * *